Figure 1:
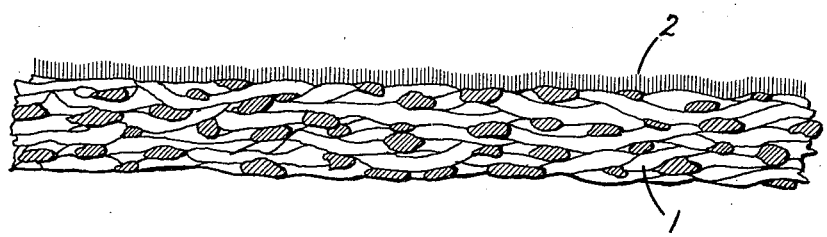

Aug. 30, 1960 L. R. B. HERVEY 2,951,005
METHOD OF FORMING A STRETCHABLE FABRIC
Filed Dec. 24, 1953

United States Patent Office 2,951,005
Patented Aug. 30, 1960

2,951,005

METHOD OF FORMING A STRETCHABLE FABRIC

Laurence R. B. Hervey, West Concord, Mass., assignor, by mesne assignments, to American Viscose Corporation, Philadelphia, Pa., a corporation of Delaware Filed Dec. 24, 1953, Ser. No. 400,360

2 Claims. (Cl. 154—123)

This invention relates to elastic or stretchable fabrics and more particularly to such fabrics having at least one surface formed of a reticulated, fibrous web formed of discontinuous fibers of an elastomeric material and provided with a suede-like or velvety finish.

Elastic fabrics are generally formed of a knitted fabric having at least some of the threads formed of rubber or from thin sheet rubber combined with a woven or knitted textile. Elastic fabrics formed of rubber thread are relatively costly and involve the preparation of a rubber filament which is generally covered with non-elastic yarns to form a composite thread which is subsequently employed in the preparation of the elastic fabric.

In the manufacture of foundation garments, bathing suits, caps, shoes and the like, rubber sheeting is secured to a reinforcing woven or knitted textile fabric. Although rubber sheeting in itself is desirable for such articles, the sheeting is highly objectionable in that it is substantially impermeable and does not permit a breathing action and the escape of normal perspiration. It is necessary, therefore, to perforate the rubber sheet so as to impart the required permeability. However, such treatment necessarily weakens the sheet and each perforation is a source of a potential tear. In order to prevent tearing and ripping of the sheet, it is combined with a textile fabric. The perforations are generally provided after the woven or knitted textile and the rubber sheet have been joined. The perforating operation damages the knitted textile and the composite sheet must be subjected to further treatment and processing so as to provide a firm bond between the rubber sheet and the textile at the areas of perforation.

For the manufacture of such articles as bathing suits, thin crinkled rubber sheet has been proposed. However, the sheet is readily punctured and torn and must be reinforced with a textile fabric. This type of composite material, although highly desirable because of its appearance, light weight and the characteristics that it will retain its shape when wet and dries quickly, is highly objectionable in that the material is substantially impermeable. Crinkled rubber sheet and calendered rubber sheet also possess the disadvantage of having appreciably different elasticities and strengths in different directions in the plane of the sheet.

An improved elastic fabric is disclosed and claimed in the copending application of Worth Wade and Ralph M. Winters, Serial No. 400,172, filed December 24, 1953. This improved elastic or stretchable fabric is formed of a reticulated, fibrous web of elastomeric fibers in random distribution and a textile which is expansible in all directions in the plane of the sheet. This type of elastic fabric is particularly suited for the manufacture of articles which contact the human body because the web of elastomeric material as well as the textile is permeable and permits a breathing action and the escape of perspiration. Although this elastic fabric possesses desirable characteristics for the manufacture of these articles, the surfaces of such fabrics having exterior plies of the reticulated, fibrous web of elastomeric fibers possess certain disadvantages from an appearance standpoint and the rubbery surface does not readily slide over the skin.

The principal purpose of the present invention is to provide an elastic or stretchable fabric having an improved appearance.

Another purpose of this invention is to provide an elastic or stretchable fabric having a surface finish which permits the fabric to slide readily over the skin.

Another object of this invention is to provide an elastic or stretchable fabric having a suede-like or velvety surface.

Other objects and advantages of this invention will become apparent from the description and claims which follow.

Heretofore, elastic fabrics of the second type described above, have been formed of a calendered rubber sheet and have possessed different elasticities and strengths in different directions in the plane of the fabric. The fabrics of the present invention utilize the reticulated, fibrous webs of elastomeric material as formed by the method disclosed and claimed in the copending application of Howard O. McMahon and Paul C. Watson, Serial No. 400,240, filed December 24, 1953. In the production of this fibrous web, a liquid dispersion of an elastomeric material is extruded into a primary high velocity stream of gas as a relatively large-diameter stream of plastic. The high velocity stream of gas attenuates and breaks transversely the stream of plastic to form a plurality of discontinuous fibers or fibrils, partially removes the solvent and partially sets the elastomeric material. A secondary stream of gas surrounding the first stream of gas carries the attenuated fibers and fibrils, removes the remainder of solvent and continues the setting operation. The attenuated fibers and fibrils are collected on a suitable collecting means and the fibrils become bonded together at their points of contact to provide a reticulated web and the web is then cured or vulcanized. The fibers are deposited in a completely and totally random or haphazard manner thereby forming a closely matted, but permeable sheet. The cured or vulcanized web has a substantially uniform elasticity and strength in all directions in the plane of the sheet. Because of its fibrous structure, the sheet or web possesses a relatively low density, but the sheet is tough and has a high resistance to abrasion and tearing and has a high tensile strength. Further, the random distribution of the fibers appear to localize any puncture, hole or abrasion and the sheet does not tear or rip upon stretching.

The elastic fabric of this invention may have as a base the reticulated, fibrous web or sheet formed of elastomeric fibers, or may comprise such a web or sheet secured to an elastic or stretchable woven or knitted textile such as, for example, a textile of the stockinet type. Alternatively, the fabric may consist of outer layers or plies of the reticulated, fibrous web or sheet with an interposed stretchable woven or knitted textile. In the use of this type of the elastic fabric for the manufacture of such articles as foundation garments, bathing suits and the like, the rubbery surface does not readily slide over the skin but tends to cling to or seize the skin, causing discomfort as the garment is put on. Although the reticulated, fibrous web may be formed of an elastomeric material dispersion or solution containing dyes and coloring material to provide a pleasing and decorative outer surface, the article still exhibits a rubbery surface.

It has been discovered that the elastic fabric may be provided with a surfacing material which overcomes the natural seizing action of the fibrous, rubbery sheet and the external surface may be provided with a pleasing and decorative surface by the application of comminuted fibers or flock.

The flock may be applied to one surface of the reticulated, fibrous web or sheet as a step in preparation of the web. The flock may be colored or may be colorless and colored subsequently by printing or dyeing to provide a desired decorative effect. In the preparation of the reticulated, fibrous web, the filaments are deposited in a random or haphazard manner and are in a tacky or adhesive, uncured condition. The flock may be applied to the surface of the sheet before the elastomeric fibers are fully set and cured.

If desired, the reticulated, fibrous web may be treated so as to cure the elastomeric fibers and the flock applied subsequently. The sheet in such case may be treated with a solvent to render the fibers on one surface and adjacent the surface tacky and the flock applied before volatilizing the solvent. As a further alternative, a suitable adhesive may be applied to one surface of the reticulated, fibrous web, the web stretched to prevent the adhesive from blocking the normal interstices and the flock applied to the adhesive coated surface. The adhesive is then dried or cured while the web is maintained in stretched condition. The web may then be secured to the textile fabric. As a further alternative, the fibrous web or sheet may be secured to the woven or knitted textile and the surface of the fibrous web subsequently provided with the flocked surface by any of the described methods.

The elastic fabric thus produced is provided with a suede-like or velvety surface on one side or on both sides, as desired. For example, where the elastic fabric consists of outer plies of the reticulated, fibrous web and an interposed stretchable textile for use in the manufacture of bathing suits, the exposed surfaces of the reticulated, fibrous webs may be provided with the flock surfacing. The flock on the inner surface may be uncolored while the flock on the exposed surface may be colored. The inner flocked surface allows the garment to slide readily over the skin while the outer flocked surface presents a decorative effect. The flocked surface may be colored or dyed or printed to provide a desired decorative effect.

Figure 2:
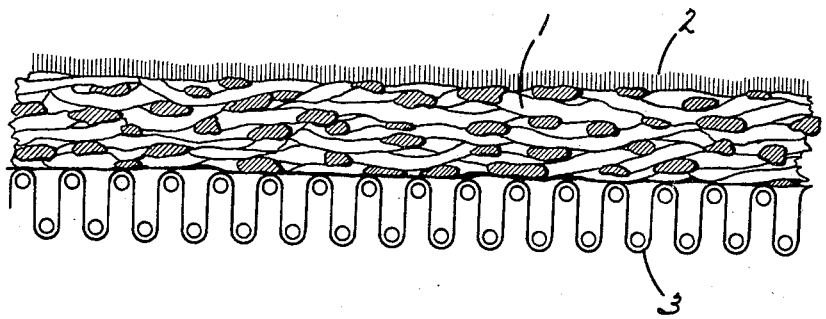

The accompanying drawing illustrates the products of this invention. Figure 1 illustrates an elastic sheet comprising a permeable, reticulated, fibrous web 1 of elastomeric fibers in random distribution bonded together at their points of contact, and a surface layer of flocked fibers 2 secured to an exposed surface of the web, the flocked fibers presenting an uninterrupted napped surface coextensive with the web. Figure 2 illustrates an elastic sheet comprising a permeable, reticulated, fibrous web 1 of elastomeric fibers in random distribution bonded together at their points of contact, a surface layer of flocked fibers 2 secured to one exposed surface of the web, the flocked fibers presenting an uninterrupted napped surface coextensive with the web, and a stretchable woven or knitted textile 3 secured to the other surface of the fibrous web of elastomeric fibers. These composite sheets possess substantially uniform elasticity and strength characteristics in all directions in the plane of the sheets.

The elastic fabrics of this invention resemble in appearance napped types of fabric but do not possess the disadvantages of the prior types of elastic fabrics, such as sheet rubber, or of other textile materials which, although originally permeable, are rendered impermeable by a surface coating.

The reticulated fibrous web is formed of an elastomeric material such as rubber, both natural rubber and synthetic rubber or rubber substitutes, for example neoprene, chloroprene polymers, butadiene-acrylonitrile copolymers, butadiene-styrene copolymers, isoprene-isobutylene copolymers, organic polysulfides and the like.

The surfacing flock may be formed of any suitable material such as cotton, wool, silk, rayon, flax or a mixture of two or more such materials. The flock is applied by any conventional method, for example, by sifting the flock through a screen to uniformly disperse the flock over the surface of the elastomeric web followed by a beating of the web, or the web may be vibrated as the flock is sifted upon the surface. Other conventional methods, such as the spray technique and the use of an electrostatic field, are equally suitable.

The reticulated, fibrous elastomeric web or sheet is preferably maintained under tension or in a stretched condition during the application of the flock, particularly when using an adhesive coating to secure the flock. After excess flock has been removed and the adhesive has been dried or cured or the elastomeric fibers have been cured, the tension is removed and the sheet or web allowed to relax. The stretching of the web, particularly where it has a surface coating of an adhesive, during the application of the flock and the curing of the elastomer prevents a closing or blocking of the interstices thereby preserving the permeability of the web. The application of the flock while the web is under tension allows the application of a greater quantity of flock per unit area of relaxed web thereby increasing the density of flock on the relaxed web. When the elastic fabric is subsequently stretched in use the flock has a better coverage than where the flock has been applied while the web is in relaxed condition.

The elastic fabric which comprises the permeable, reticulated, fibrous web of elastomeric fibers having a surface coating of flocked fibers is particularly well suited for the manufacture of bathing garments, foundation garments, elastic stockings, belts, garters, galluses, shoe parts and the like.

Since variations and modifications may be made in carrying out the invention, without departing from its spirit and scope, it is to be understood that the invention is not to be limited except as defined in the appended claims.

I claim:

1. The method of forming a stretchable sheet material which comprises applying an adhesive to one surface of a permeable, reticulated, fibrous web of elastomeric fibers in random distribution and bonded together at their points of contact, stretching the fibrous web to open the interstices in at least the surface portion of the fibrous web and prevent blocking of the interstices by the adhesive, applying flocked fibers to the adhesive coated surface, curing the adhesive and allowing the fibrous web to relax whereby the flocked fibers form an uninterrupted napped surface coextensive with the web.

2. The method of forming a stretchable sheet material which comprises applying an adhesive to one surface of a permeable, reticulated, fibrous web of elastomeric fibers in random distribution and bonded together at their points of contact, stretching the fibrous web to open the interstices in at least the surface portion of the fibrous web and prevent blocking of the interstices by the adhesive, applying flocked fibers to the adhesive coated surface, curing the adhesive, securing a non-elastomeric, expansible textile fabric to the opposite surface of the fibrous web and allowing the fibrous web to relax whereby the flocked fibers form an uninterrupted napped surface coextensive with the web.

References Cited in the file of this patent

UNITED STATES PATENTS

| | | |
|---|---|---|
| 25,192 | Goodyear | Aug. 23, 1859 |
| 2,077,514 | Callahan | Apr. 20, 1937 |
| 2,135,901 | Lea | Nov. 8, 1938 |
| 2,228,735 | Spraragen | Jan. 14, 1941 |
| 2,464,301 | Francis | Mar. 15, 1949 |
| 2,473,528 | Hoover | June 21, 1949 |
| 2,476,282 | Castellan | July 19, 1949 |
| 2,543,101 | Francis | Feb. 27, 1951 |

FOREIGN PATENTS

| | | |
|---|---|---|
| 804,987 | France | Aug. 17, 1936 |